Dec. 23, 1969   R. J. SEARLE   3,485,509
MAN-POWERED WHEELED VEHICLES

Filed June 27, 1967   3 Sheets-Sheet 1

Dec. 23, 1969     R. J. SEARLE     3,485,509

MAN-POWERED WHEELED VEHICLES

Filed June 27, 1967     3 Sheets-Sheet 2

United States Patent Office 3,485,509
Patented Dec. 23, 1969

3,485,509
MAN-POWERED WHEELED VEHICLES
Russell John Searle, Rosemead, Bridge Road,
Chertsey, Surrey, England
Filed June 27, 1967, Ser. No. 649,295
Claims priority, application Great Britain, July 5, 1966,
30,050/66; Aug. 4, 1966, 35,062/66
Int. Cl. B62m 1/14; B62k 17/00, 5/00
U.S. Cl. 280—243
4 Claims

ABSTRACT OF THE DISCLOSURE

A wheeled invalid carriage or child's toy vehicle, for which drive is developed by pulling strokes exerted on a cable, or spring strip, wound on a spool coupled to one ground wheel through a freewheel mechanism. The spool is returned between driving strokes, to rewind the cable or strip, by a separate spring or by the natural spring tendency of such spring strip. The driving strokes may be exerted by way of an adjustable lever mechanism.

---

Figure 1:
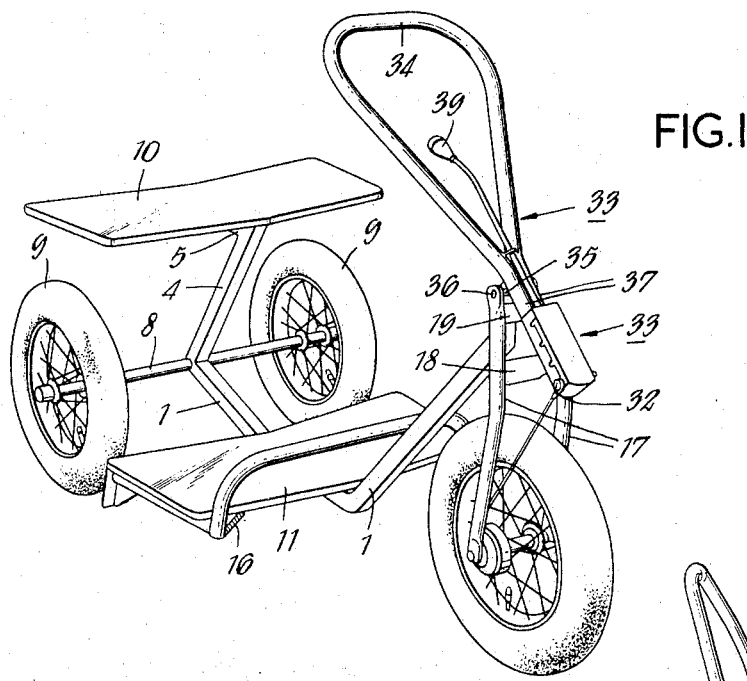

This invention relates to man-powered wheeled vehicles, for example invalid carriages or toy vehicles for children to ride on, and is more particularly concerned with the man-powered means whereby drive for such vehicle can be developed by a rider and applied to a ground wheel through a freewheel mechanism. Such vehicles may be adapted to be propelled solely by man-power, or the man-powered means may be provided as an alternative to, or for the assistance of, motor-powered drive means.

Such invalid carriages and toy vehicles have hitherto employed a sprocket-and-chain drive, operated either by the feet or, in the case of some invalid carriages for handicapped people, by hand. The oil normally applied to the chain of such a drive in order to keep it in good running condition results in such drive mechanisms being undesirably messy to deal with, and the danger may exist also of fingers or parts of clothing being caught between the chain and the sprockets engaging therewith. The relatively complex construction of such chain, and the expense involved in providing the driving sprocket-wheel and bearings therefor, all add to the overall cost of the vehicle.

Another form of prior vehicle is driven by means of reciprocating levers or foot-driven cranks operating through connecting rods on a cranked rear axle. With this arrangement the drive ratio between the number of reciprocatory foot movements and the rotation of the driven rear wheels is limited severely unless expensive gearing is inserted between the driven cranks and the actual rear wheels. Further, such arrangements do not generally include a freewheel mechanism.

According to the present invention there is provided man-powered vehicle comprising: a frame including a first frame part for supporting a rider and a steering part connected with the first frame part but pivotable with respect thereto about an upwardly extending steering axis; a rotatable ground-engaging wheel on which the said first frame part is mounted for support above the ground; a further rotatable ground-engaging wheel on which the said steering part is mounted for support; a freewheel mechanism connected with the said further ground-engaging wheel for transmitting rotary drive thereto; man-powered drive means including a spool mounted rotatably (about a central axis thereof) on the said steering part and connected with the freewheel mechanism for applying such drive thereto, a flexible elongate member having two opposite ends, one of which is attached to the spool, for being wound around the spool and subsequently pulled therefrom to impart rotary drive thereto, and resilient means connected to the spool for returning the spool to rewind the flexible member therearound after being pulled therefrom; and a lever device having a first portion attached to the other of the said two opposite ends of the flexible member for pulling it from the spool, a second portion, connected with but spaced from the first portion, at which the lever device is pivotally attached to the said steering part to pivot thereon about a horizontal axis, and a handle portion, connected with but spaced from the second portion, for movement laterally to steer the vehicle and for movement in a vertical plane to impart drive to the vehicle. The said flexible elongate member may comprise a strip spring having a tendency to wind itself around the spool, and itself constituting the said resilient means, or alternatively the said resilient means may comprise a flat helical spring coiled about the axis of the said spool and connected between the spool and the vehicle frame.

In accordance with one embodiment of the invention, means is provided for selectively varying the ratio of the respective distances from the said second portion to the said first and handle portions. Thus, the said lever device may include a lever-ratio change member having one portion which constitutes the said first portion and being movable with respect to the said second and handle portions, and may further include means for retaining the lever-ratio change member in any selected one of a plurality of positions with respect to the said second and handle portions, such positions affording different respective values of the ratio of the respective distances from the said second portion to the said first and handle portions of the lever device.

A vehicle embodying the invention may thus be considered to differ from one of the above-mentioned prior vehicles in that the sprocket-and-chain drive mechanism of the prior vehicle is replaced by a relatively simple and inexpensive spool drive provided with spring return means. Furthermore, the steered wheel is also the driven wheel, which simplifies the driving and steering linkages considerably as compared with otherwise similar prior vehicles.

As a child's toy, a vehicle embodying the invention can be made simply and cheaply and can provide an alternative to previously-known children's tricycles. In the field of children's toys, of course, the simple fact that a vehicle embodying the present invention is different in appearance and operation from prior types of toy vehicle is sufficient in itself to appeal to children. Further, the difference between the rotary method of imparting drive to previously-known chain-driven tricycles, for example, and the basically reciprocatory method of imparting drive to keep a vehicle embodying the invention in motion is of value in broadening a child's knowledge of the mechanical world and developing muscles different from those used in propelling a chain-driven vehicle.

The driving ratio, between the number of reciprocatory driving strokes and the number of rotations of the driven wheel in an embodiment of the invention can be made relatively high as compared with the prior reciprocatory crank-driven vehicle described hereinbefore.

Figure 2:
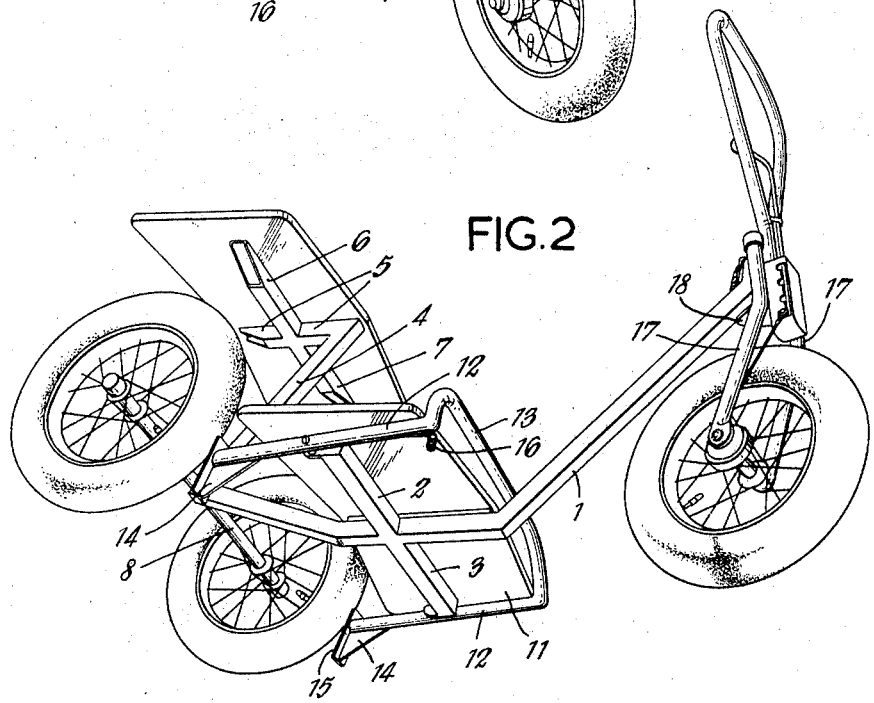
Figure 4:
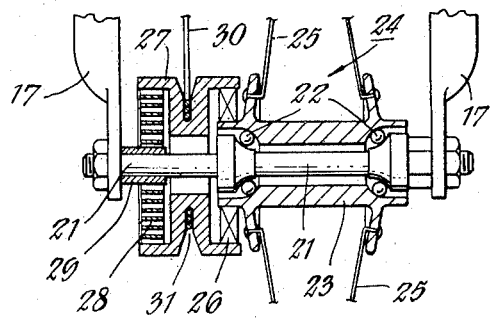
Figure 5:
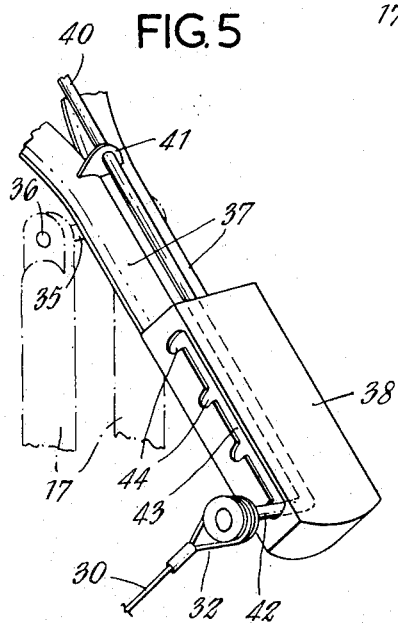
Figure 3:
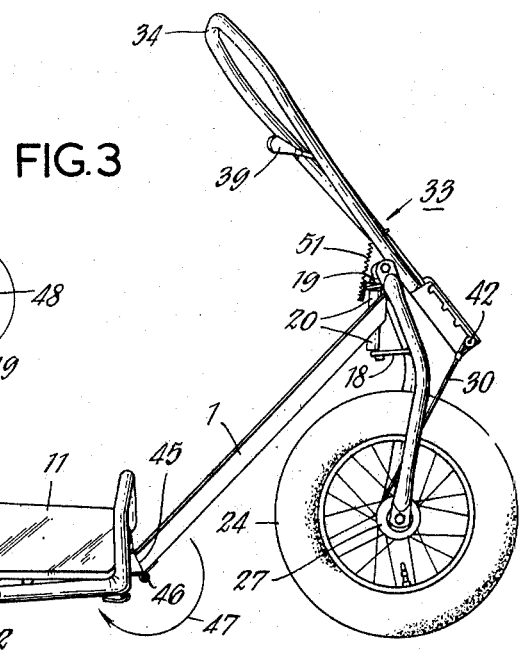
Figure 7:
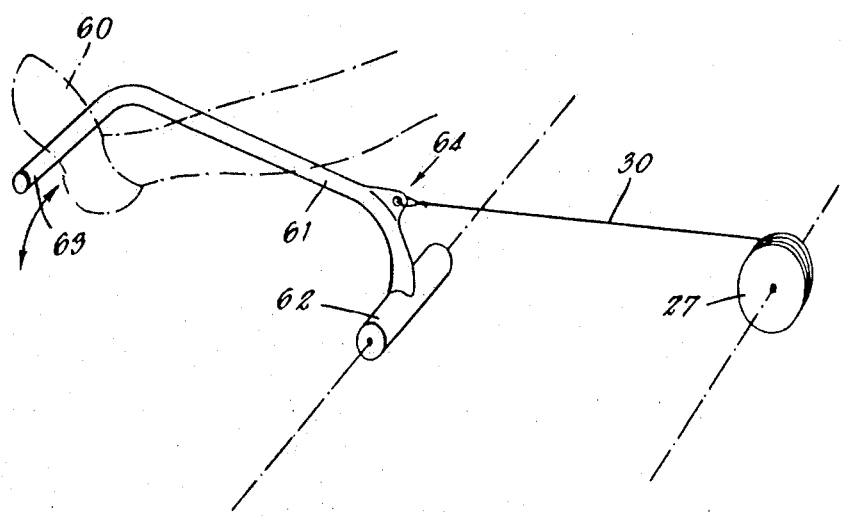
Figure 6:
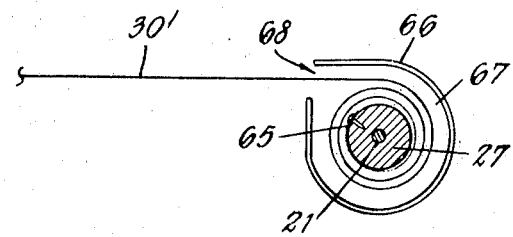

Reference will now be made, by way of example, to the accompanying drawings, in which:

FIGURE 1 shows a front perspective view of a hand-propelled vehicle embodying the invention, FIGURE 2 shows a perspective view of the vehicle as seen from below, FIGURE 3 shows a perspective side view of a modified form of the vehicle, FIGURE 4 shows, to a larger scale, an axially sectioned view of part of the vehicle, FIGURE 5 shows to an enlarged scale a detail of FIGURE 1, and FIGURE 6 shows diagrammatically a modification which may be made to the vehicles of FIGURES 1 to 5.

Throughout the drawings, the same reference numerals are used for parts performing substantially identical functions.

With reference generally to FIGURES 1 to 5, and more particularly to FIGURES 1 and 2, the vehicle there shown includes a frame member 1 extending longitudinally of the vehicle. Frame members 2 and 3 (see FIGURE 2) extend laterally to opposite sides of the member 1 at an intermediate location therealong. Another frame member 4 extends upwardly from the rearward end of the member 1 and carries at its upper end a rearwardly-extending frame member 5, from an intermediate location along which extend laterally, to opposite sides of the member 5, two frame members 6 and 7 (see FIGURE 2). The aforesaid frame members 1 to 7 are made from square-section metal tubing. Through the junction of the frame members 1 and 4 passes a rear axle 8 on which are rotatably mounted, in known manner, two ground-engaging rear wheels 9 fitted with pneumatic tyres in known manner. A seat 10 is carried by the members 5 to 7, and a foot-plate 11 is carried by the member 1 above the laterally-extending members 2 and 3.

Braking means fitted to the frame comprise two bars 12 which are parallel to one another and are pivotally attached respectively to the outward ends of the laterally-extending frame members 2 and 3. The forward ends of the bars 12 are interconnected by a foot-bear 13 which is integral with the two bars 12. The rearward ends of the two bars 12 are fitted with respective brackets 14 supporting braking pads adapted to engage with the tyres on the wheels 9 so as to bring the vehicle to a halt. The braking pads are normally held out of engagement with the wheels 9 by means of a helical spring 16 which is effective between the foot-plate 11 and the forward end of one of the bars 12. Downward pressure on the foot-bar 13, by the foot of a rider of the vehicle, can counteract the effect of the spring 16 so as to bring the braking pads into engagement with the wheels 9.

At its forward end the frame includes front fork members 17 which are rigidly interconnected at their upper ends by means of two brackets 18 and 19. The forward end of the frame member 1 has passed through it and rigidly fixed thereto a substantially vertical sleeve 20 (see FIGURE 3). A pivotal connection between the frame member 1 and the brackets 18 and 19 is effected by means of a pin (not shown) which passes through the sleeve 20 and also through respective holes in the brackets 18 and 19. The axis of this pivotal interconnection constitutes a steering axis for the vehicle.

FIGURE 4 shows details of the construction at the lower ends of the front fork members 17. Bolted between those members in know manner is a horizontal axle 21 passing through ball-bearings 22 within the hub 23 of a front wheel 24 in known manner. The front wheel 24 is of known type, having spokes 25 and a pneumatic tyre similar to that fitted to each of the rear wheels 9.

A freewheel mechanism 26, of well-known type, is mounted in driving connection with the hub 23, and supports in turn a driving spool 27. The spool 27 is recessed axially at both axial ends, the freewheel mechanism 26 being housed in one such axial recess. The other axial recess houses resilient spool-return means comprising a flat helical spring 28 formed from a strip of metal coiled about the common central axis of the spool 27 and front wheel 24. At its outer end the strip of metal forming the spring 28 is fixed to the spool 27, and the inner end of the spring strip is fixed to a sleeve 29 through which the axle 21 passes and which is fixedly attached (for example by welding) to the left-hand for member 17 (as viewed in FIGURE 4). A drive cable 30 has one end (not shown) attached to the spool 27 and is wound therearound in a number of turns 31. From the spool 27 the cable 30 is led off and its other end 32 is formed into a loop and attached to a forward portion of a lever device generally indicated at 33 in FIGURE 1.

The action of the spring 28 between the sleeve 29 and the spool 27 is to turn the spool in an anticlockwise direction so viewed in FIGURES 1 to 3, so as to tend to rewind the cable 30 onto the spool. The freewheel mechanism 26 allows such anticlockwise turning of the spool 27, with respect to the front fork parts of the vehicle frame, without imparting any drive to the hub 23 of the front wheel.

With reference to FIGURE 1, for example, the greater part of the lever device is made from metal tubing which is bent round on itself to form a loop, a rear end portion 34 of which provides a handle for operation by a rider to impart drive to the vehicle. The ends of the looped metal tubing are brought together at an intermediate location whereat they are welded to a horizontal pivot pin 35, and are extended forwardly to support a forward end part of the lever device. The opposite ends of the pivot pin 35 are mounted rotatably in respective holes 36 formed at the tops of the front fork members 17, thus providing a pivot point for the lever device 33.

FIGURE 5 shows the forward end of the lever device 33 in more detail. The forwardly extended ends 37 of the looped tubing support a sheet metal housing 38, providing part of a lever-ratio change means operable by way of a handle 39 (see FIGURE 1). The handle 39 is provided on the rear end of a rod 40 which, for guiding purposes, passes slidably through an apertured bracket (41), welded to the tubing 37, and through an aperture (not shown) at the rearward end of the housing 38. The forward end of the rod 40 is bent through 90° to provide a laterally extending part 42 which forms the aforesaid forward portion (of the lever device 33) to which the looped end 32 of the cable 30 is attached. The laterally extending part 42 of the rod 40 projects outwardly from the housing 38 via a slot 43 at the side of the housing. Four notches as at 44 are provided along the lower edges of the slot for positively locating the part 42 therein as desired.

In use of the vehicle, a rider imparts drive thereto by working the handle 34 up and down. On the downward stroke of the handle 34, the forward portion of the lever device 33 rises and pulls cable off the spool 27. This imparts a rotary drive, in a clockwise direction as seen in FIGURES 1 to 3, to the spool 27, and this rotary drive is transmitted through the freewheel mechanism 26 (FIGURE 4) to the front wheel 24 of the vehicle, causing it to travel along the ground. During the succeeding upward stroke of the handle 34, the forward portion of the lever device 33 moves downwardly, allowing the spool 27 to be returned by the spring 28 (FIGURE 4) in an anticlockwise direction again. The cable 31 is thus caused to be rewound around the spool 27, the freewheel mechanism 26 (FIGURE 4) allowing the front wheel 24 (and therefore the vehicle as a whole) to run on while the cable-rewinding action takes place. The next downward stroke of the handle 34 will impart a further driving impulse to the wheel 24, and so on.

The effort required to work the handle 34 at a desired rate can be varied by means of the aforesaid lever-ratio change means. FIGURE 5 shows the laterally extending portion 42 of the rod 40 lodged in the foremost one of the four notches 44, this giving the lever-ratio a value which requires maximum effort to be exerted on the handle 34, but accordingly can give maximum speed of drive. The lever-ratio may be changed selectively by operating the handle 39 (FIGURE 1) to raise the laterally extending portion 42 from the foremost notch 44 and move it rearwardly along the slot 43 until it becomes lodged (pulled downwardly under the action of the tension in the cable 30) in one of the more rearward notches 44. In this way the necessary driving exertion on the handle 34 may be reduced, with corresponding reduction of driving speed. The lever-ratio change means is thus equivalent to a gear-change mechanism operative between the handle 34 and the driving spool 27.

FIGURE 3 shows a foldable version of the vehicle of FIGURES 1 and 2. It should first be appreciated that FIGURE 3 is not a conventional side elevation, but shows the vehicle as seen from the side by a human observer so that, for example, foot-plate 11 and rear wheels 9 appear as seen from a little above and forwardly thereof. The frame member 1 is broken at a location 45, just forward of the foot-plate 11, and joined underneath by a hinge 46. In use of the vehicle the weight of a rider will maintain the rigidity of the frame at the location 45, but when the vehicle is not in use the frame member 1 can be folded about the hinge 46 in the direction indicated by an arrow 47. The frame is also broken at the junction between the upwardly extending member 4 and the rearwardly extending member 5 and fitted at this point with a hinge 48. During use of the vehicle the weight of a rider on the seat 10 will maintain the necessary rigidity of the frame at the junction between the members 4 and 5, but when the vehicle is out of use the member 5 can be folded forwardly and down towards the member 4 as indicated by an arrow 49. It is further possible to provide a frame break and hinge (not shown) at the junction between the frame member 1 and the upwardly extending member 4, such that a rider's weight will maintain the necessary rigidity of the frame during use of the vehicle, but such that at other times the member 4 can be folded backwardly and down underneath the member 1 as indicated by an arrow 50.

FIGURE 3 also indicates the possibility of adjusting (during manufacture) the driving effort needed on the handle 34 by fitting a helical spring 51 to act as desired between the rearward end of the lever device 33 and a small bracket fixedly attached to the sleeve 20.

The vehicle of FIGURES 1 to 5 can, in a relatively large form, be used as a hand-propelled invalid carriage. For use by a legless rider the foot-operated braking means can be replaced by a hand-brake lever mounted on the handle 34 and communicating through a flexible Bowden cable with a caliper brake operative on the front wheel 24 in known manner. Alternatively, in a relatively small form, the vehicle can be designed as a toy, to be ridden by a child as an alternative to a child's tricycle of previously well-known type.

FIGURE 6 illustrates a further modification which may be made to the vehicles illustrated in the preceding figures. In accordance with FIGURE 6 the driving spool 27 comprises a cylinder to which is attached one end 65 of a steel strip spring 30', which is wound around the spool 27 and led off therefrom to perform the functions of the cable 30 of FIGURES 1 to 5. However, the strip spring 30' comprises a strip of steel which has been strained to deform it permanently in such a manner that when unconstrained it coils up closely upon itself in the form of an annular body. Such strip springs are known in themselves, and are discussed, for example, in British patent specification No. 728,611. When a rider of the vehicle concerned applies driving tension to the flexible strip 30', the strip will be unwound from the spool 27, applying driving force to the wheel 24 through the freewheel mechanism as described hereinbefore. When the rider releases the tension, at the end of a driving stroke, the tendency of the strip 30' to wind itself up will manifest itself, causing the spool 27 to be returned in a clockwise direction (as viewed in FIGURE 6) while the strip 30' is rewound therearound ready for the next driving stroke. It will be appreciated, therefore, that the modification of FIGURE 6 renders the use of a separate return spring 28 (FIGURE 4) unnecessary, since the strip spring 30' itself constitutes the resilient spool-returning means of the invention, as well as the flexible elongate member of the invention. As shown in FIGURE 6, the spool may be surrounded by a housing 66 enclosing a space 67, for the rewound strip spring 30', and provided with an outlet aperture 68 through which the strip spring 30' is taken to the means for applying driving tension thereto.

The invention is of course not limited in application to three-wheeled vehicles. For example, the invention could be applied to a two-wheeled vehicle, the drive being applied to one of the two wheels, or to a four-wheeled vehicle in which the drive is applied simultaneously to two front wheels mounted on the same axle.

I claim:
1. A man-powered vehicle comprising:
   (i) a frame including:
      (a) a first frame part for supporting a rider, and
      (b) a steering part connected with the first frame part but pivotable with respect thereto about an upwardly extending steering axis;
   (ii) a rotatable ground-engaging wheel on which the said first frame part is mounted for support above the ground;
   (iii) a further rotatable ground-engaging wheel on which the said steering part is mounted for support;
   (iv) a freewheel mechanism connected with the said further rotatable ground-engaging wheel for transmitting rotary drive thereto;
   (v) man-powered drive means including:
      (a) a spool mounted rotatably, about a central axis thereof, on the said steering part and connected with the freewheel mechanism for applying such drive thereto,
      (b) a flexible elongate member having two opposite ends, one of which is attached to the spool, for being wound around the spool and subsequently pulled therefrom to impart rotary drive thereto, and
      (c) a flat helical spring coiled about the axis of the spool, and connected between the spool and the said steering part for returning the spool to rewind the flexible member therearound after being pulled therefrom; and
   (vi) a lever device having:
      (a) a first portion attached to the other of the said two opposite ends of the flexible member for pulling it from the spool,
      (b) a second portion, connected with but spaced from the first portion, at which the lever device is pivotally attached to the said steering part to pivot thereon about a horizontal axis, and
      (c) a handle portion connected with but spaced from the second portion, for movement laterally to steer the vehicle and for movement in a vertical plane to impart drive to the vehicle.
2. A man-powered vehicle comprising:
   (i) a frame including:
      (a) a first frame part for supporting a rider, and
      (b) a steering part connected with the first frame part but pivotable with respect thereto about an upwardly extending steering axis;
   (ii) a rotatable ground-engaging wheel on which the said first frame part is mounted for support above the ground;
   (iii) a further rotatable ground-engaging wheel on which the said steering part is mounted for support;
   (iv) a freewheel mechanism connected with the said further rotatable ground-engaging wheel for transmitting rotary drive thereto;
   (v) man-powered drive means including:
      (a) a spool mounted rotatably, about a central axis thereof, on the said steering part and connected with the freewheel mechanism for applying such drive thereto,
      (b) a flexible elongate member having two opposite ends, one of which is attached to the spool, for being wound around the spool and subsequently pulled therefrom to impart rotary drive thereto, and

(c) resilient means connected to the spool for returing the spool to rewind the flexible member therearound after being pulled therefrom, said flexible elongate member comprising a strip spring, having a tendency to wind itself around the spool, and itself constituting the said resilient means; and (vi) a lever device having:
  (a) a first portion attached to the other of the said two opposite ends of the flexible member for pulling it from the spool,
  (b) a second portion, connected with but spaced from the first portion, at which the lever device is pivotally attached to the said steering part to pivot thereon about a horizontal axis, and
  (c) a handle portion, connected with but spaced from the second portion, for movement laterally to steer the vehicle and for movement in a vertical plane to impart drive to the vehicle.

3. A man-powered vehicle comprising:
(i) a frame including:
  (a) a first frame part for supporting a rider, and
  (b) a steering part connected with the first frame part but pivotable with respect thereto about an upwardly extending steering axis;
(ii) a rotatable ground-engaging wheel on which the said first frame part is mounted for support above the ground;
(iii) a further rotatable ground-engaging wheel on which the said steering part is mounted for support;
(iv) a freewheel mechanism connected with the said further rotatable ground-engaging wheel for transmitting rotary drive thereto;
(v) man-powered drive means including:
  (a) a spool mounted rotatably, about a central axis thereof, on the said steering part and connected with the freewheel mechanism for applying such drive thereto,
  (b) a flexible elongate member having two opposite ends, one of which is attached to the spool, for being wound around the spool and subsequently pulled therefrom to impart rotary drive thereto, and
  (c) resilient means connected to the spool for returning the spool to rewind the flexible member therearound after being pulled therefrom; and
(vi) a lever device having:
  (a) a first portion attached to the other of the said two opposite ends of the flexible member for pulling it from the spool,
  (b) a second portion, connected with but spaced from the first portion, at which the lever device is pivotally attached to the said steering part to pivot thereon about a horizontal axis,
  (c) a handle portion, connected with but spaced from the second portion, for movement laterally to steer the vehicle and for movement in a vertical plane to impart drive to the vehicle, and
  (d) means for selectively varying the ratio of the respective distances from the said second portion to the said first and handle portions.

4. A man-powered vehicle comprising:
(i) a frame including:
  (a) a first frame part for supporting a rider, and
  (b) a steering part connected with the first frame part but pivotable with respect thereto about an upwardly extending steering axis;
(ii) a rotatable ground-engaging wheel on which the said first frame part is mounted for support above the ground;
(iii) a further rotatable ground-engaging wheel on on which the said steering part is mounted for support;
(iv) a freewheel mechanism connected with the said further rotatable ground-engaging wheel for transmitting rotary drive thereto;
(v) man-powered drive means including:
  (a) a spool mounted rotatably, about a central axis thereof, on the said steering part and connected with the freewheel mechanism for applying such drive thereto,
  (b) a flexible elongate member having two opposite ends, one of which is attached to the spool, for being wound around the spool and subsequently pulled therefrom to impart rotary drive thereto, and
  (c) resilient means connected to the spool for returning the spool to rewind the flexible member therearound after being pulled therefrom; and
(vi) a lever device having:
  (a) a first portion attached to the other of the said two opposite ends of the flexible member for pulling it from the spool,
  (b) a second portion, connected with but spaced from the first portion, at which the lever device is pivotally attached to the said steering part to pivot thereon about a horizontal axis,
  (c) a handle portion, connected with but spaced from the second portion, for movement laterally to steer the vehicle and for movement in a vertical plane to impart drive to the vehicle, and
  (d) a lever-ratio change member having one portion which constitutes the said first portion and being movable with respect to the said second and handle portions, and
  (e) means for retaining the lever-ratio change member in any selected one of a plurality of positions with respect to the said second and handle portions, such positions affording different respective values of the ratio of the respective distances from the said second portion to the said first and handle portions of the lever device.

References Cited

UNITED STATES PATENTS

| | | | |
|---|---|---|---|
| 585,421 | 6/1897 | Bemis | 280—243 |
| 2,732,221 | 1/1956 | Welch | 280—246 |
| 288,219 | 11/1883 | Elliott | 280—243 |
| 1,154,616 | 9/1915 | Davis | 280—243 X |
| 1,359,957 | 11/1920 | Bolen et al. | 280—243 X |
| 1,553,131 | 9/1925 | Benedict | 280—243 |
| 1,620,926 | 3/1927 | Trullinger | 280—243 X |
| 2,012,683 | 8/1935 | Johnson | 280—243 X |

KENNETH H. BETTS, Primary Examiner

U.S. Cl. X.R.

280—282, 287